Figure 1:
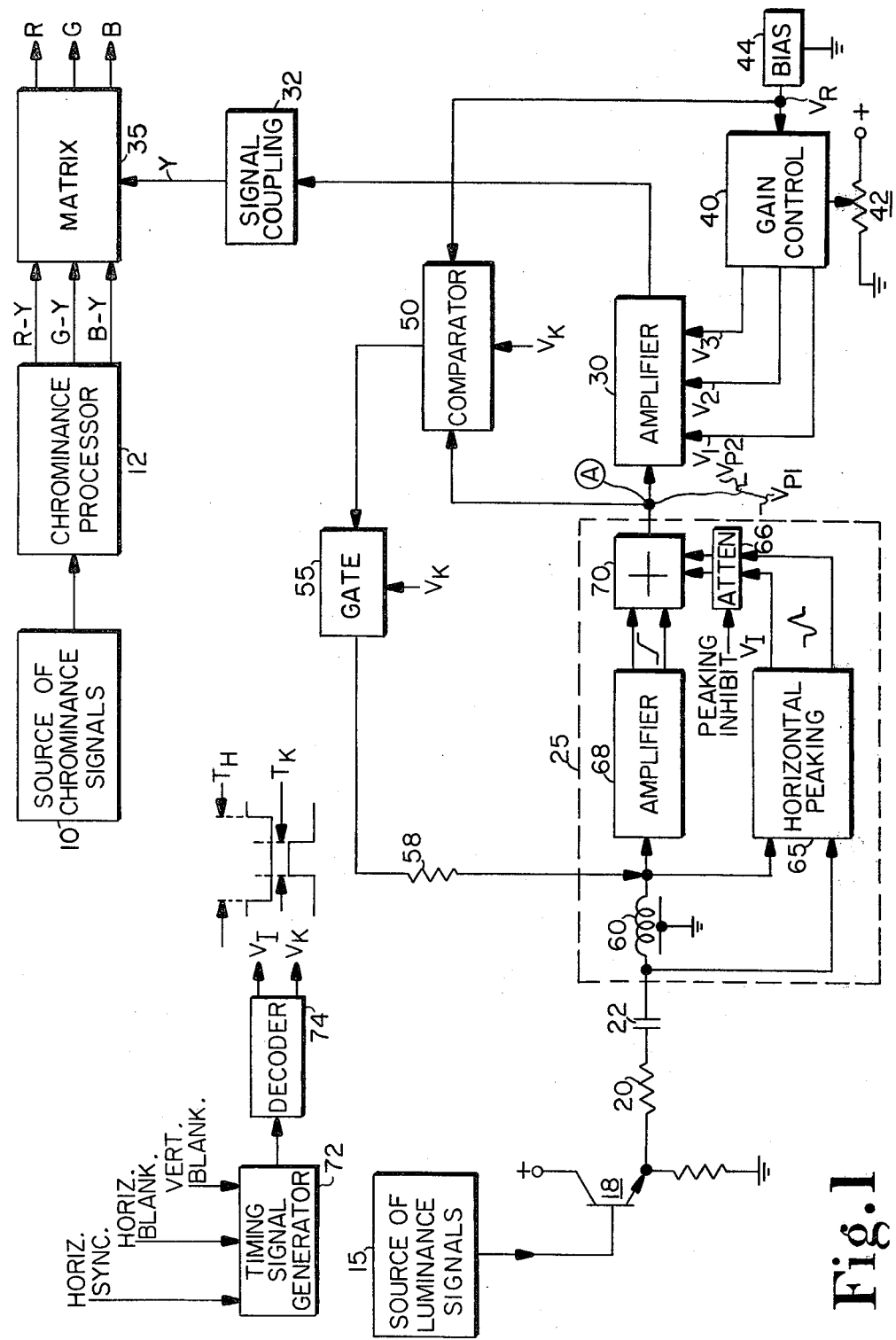

United States Patent

Shanley, II et al.

[11] 4,386,369
[45] May 31, 1983

[54] COMPENSATED CLAMPING CIRCUIT IN A VIDEO SIGNAL PEAKING SYSTEM

[75] Inventors: Robert L. Shanley, II; Robert P. Parker, both of Indianapolis, Ind.

[73] Assignee: RCA Corporation, New York, N.Y.

[21] Appl. No.: 304,345

[22] Filed: Sep. 22, 1981

[51] Int. Cl.³ .............................................. H04N 5/14
[52] U.S. Cl. ..................................... 358/166; 358/172
[58] Field of Search ...................... 358/36, 39, 40, 160, 358/162, 167, 169, 166, 171, 172, 174

[56] References Cited

U.S. PATENT DOCUMENTS

| | | | |
|---|---|---|---|
| 4,110,790 | 8/1978 | Wheeler | 358/162 |
| 4,263,616 | 4/1981 | Lee | 358/166 |
| 4,295,435 | 10/1981 | d'Hautecourt | 358/166 |
| 4,316,210 | 2/1982 | Wharton | 358/166 |
| 4,316,214 | 2/1982 | Yost | 358/172 |
| 4,338,630 | 7/1982 | Engel | 358/172 |

OTHER PUBLICATIONS

Schematic circuit diagram (FIG. 31, pp. 39-40) for the RCA CTC-111 Color Television Receiver, as published in the RCA Television Service Data Bulletin (No. C-3, 1981) available from the RCA Consumer Electronics Division, Technical Publications.

Primary Examiner—Michael A. Masinick
Attorney, Agent, or Firm—Eugene M. Whitacre; Paul J. Rasmussen; Ronald H. Kurdyla

[57] ABSTRACT

A television receiver includes means for generating a peaking component which is combined with a video signal to produce a peaked video signal, and a control circuit responsive to the peaked video signal during prescribed control intervals for automatically controlling a reference level of the video signal. The peaking component is attenuated during the control intervals to prevent the control network from responding to spurious signals including noise, which would otherwise be enhanced by the peaking generator and distort an output control voltage from the control circuit. In a system wherein the control circuit is arranged in a feedback loop with a peaking generator comprising a delay line, such attenuation also serves to stabilize the feedback control loop against oscillation.

11 Claims, 3 Drawing Figures

COMPENSATED CLAMPING CIRCUIT IN A VIDEO SIGNAL PEAKING SYSTEM

This invention concerns a clamping circuit which operates with respect to a video signal processing circuit including means for peaking the video signal and which is stabilized against oscillation.

It is known that the response of a video signal processing system, such as found in a television receiver, can be subjectively improved by increasing the slope or "steepness" of video signal amplitude transitions, thereby effectively increasing the high frequency response of the system. In this regard the video signal response can be improved by generating a signal "preshoot" immediately before an amplitude transition, and a signal "overshoot" immediately after the amplitude transition, so that black-to-white and white-to-black amplitude transitions are accentuated. This result is commonly achieved by developing a peaking signal component which is added to the video signal to produce a peaked video signal with accentuated amplitude transitions. An arrangement for developing such a peaked video signal in response to a peaking signal component often includes a reactive element as shown, for example, in a copending U.S. patent application Ser. No. 255,982 of W. E. Harlan, now U.S. Pat. No. 4,350,995, titled "SELF-LIMITING VIDEO SIGNAL PEAKING CIRCUIT".

A television signal processing system typically requires a DC restoration clamping circuit for automatically controlling a DC reference level of the video signal. When the clamping circuit is arranged in a feedback control loop with respect to the circuits which generate the peaking component, the control circuit should be designed to prevent the feedback loop from oscillating, particularly when the peaking circuits include reactive elements and exhibit significant signal gain. Oscillation of the feedback control loop can distort the output control signal of the control network and can render the control circuit ineffective for its intended purpose. In addition, such oscillation produces unwanted signals which can interfere with other signal processing circuits in the system.

Oscillation of the control loop can be prevented by designing the control loop so that the loop AC gain and phase shift will be incapable of supporting oscillation. For example, the likelihood of oscillation can be minimized by employing additional AC signal bypass networks (e.g., including filter capacitors) or other forms of frequency selective, bandwidth limiting networks in conjunction with the control loop. However, such additional networks undesirably add to the cost of the control network, and typically include reactive components which are undesirable when the control circuit is intended to be formed in an integrated circuit since reactive components are difficult or impractical to integrate. Although integrated circuit filter capacitors are known, these undesirably occupy a large amount of integrated circuit surface area. Also, discrete networks employed in conjunction with an integrated control circuit must be coupled to the integrated circuit by means of one or more external terminals of the integrated circuit, which are limited in number.

The control circuit disclosed herein is particularly useful in a television receiver including a network for automatically controlling the black reference level of a peaked video signal. The peaked video signal is developed by combining a video signal with a peaking component generated by a peaking circuit about which the feedback loop of the control circuit is coupled. The control loop is prevented from oscillating by attenuating the peaking component during control intervals when the control network operates to sense and control the video signal reference level. In addition to stabilizing the control loop, attenuating the peaking component during the control intervals also advantageously serves to prevent the control network from responding to enhanced spurious high frequency signals, including noise, which would otherwise be sensed by the control network and result in a distorted output control signal.

A control network according to the invention is capable of being formed in an integrated circuit in large part and does not require additional reactive signal bypass or bandwidth limiting networks for the purpose of minimizing the likelihood of control loop oscillation.

Figure 2:
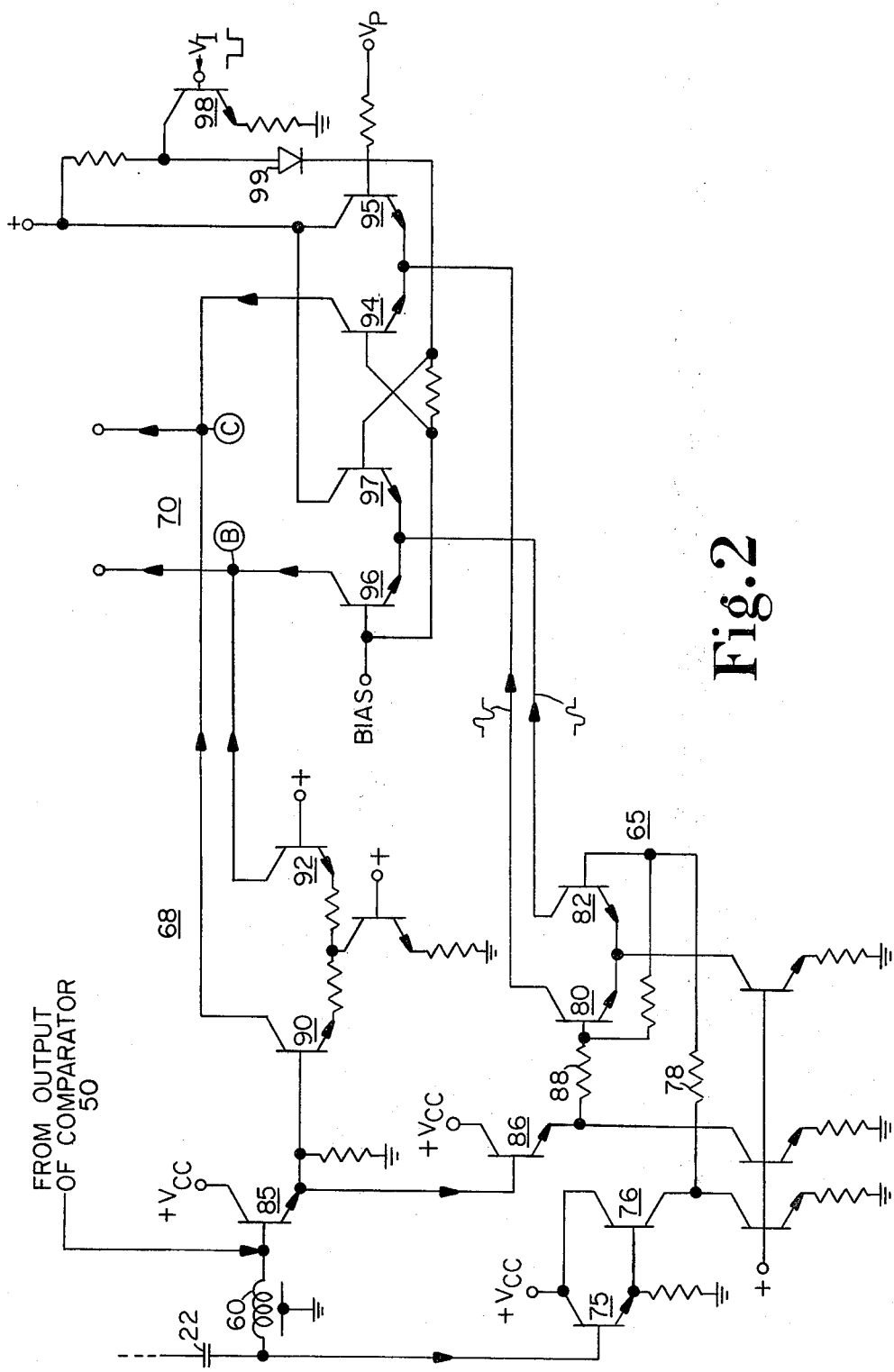
Figure 3:
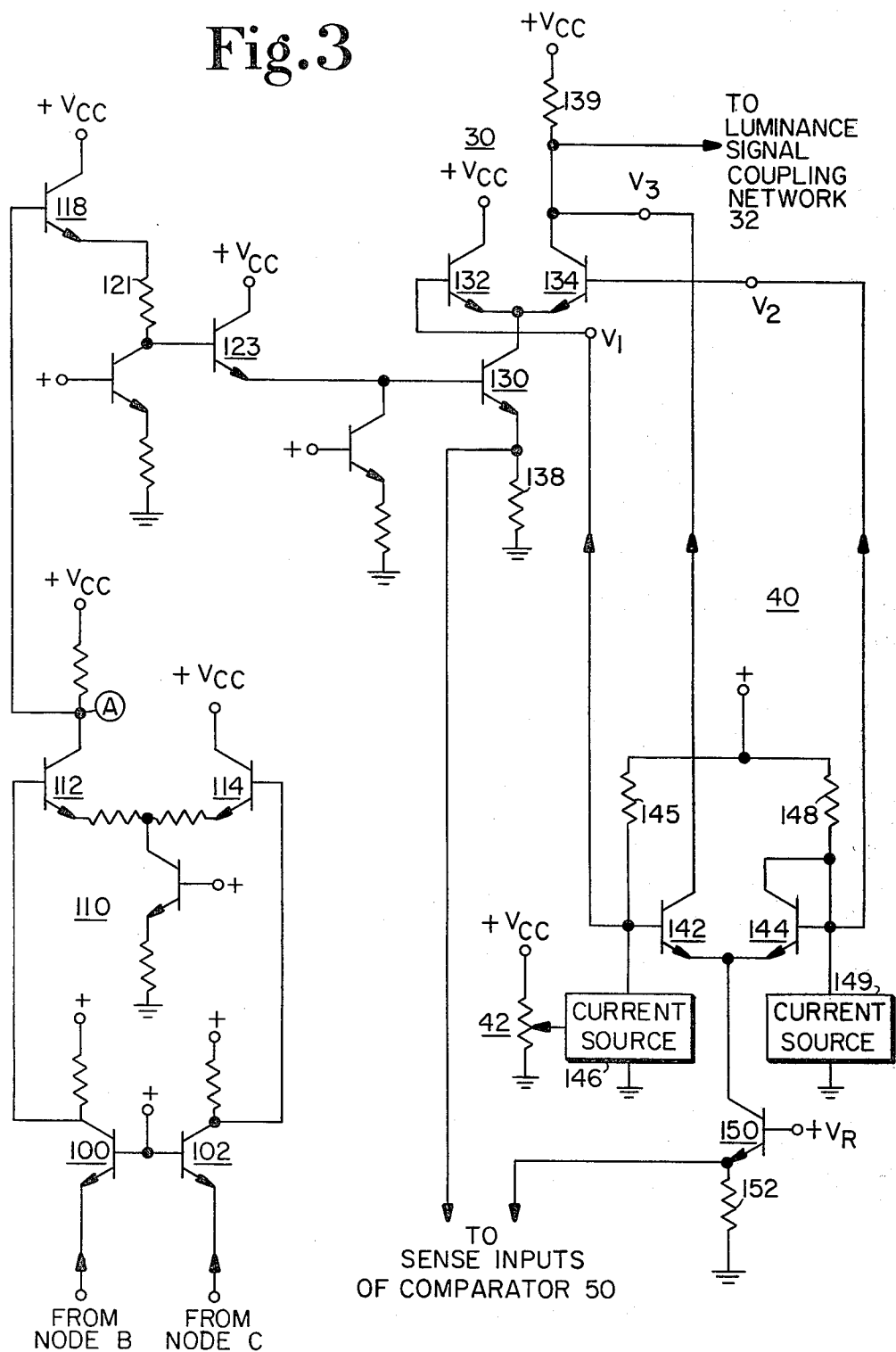

In the drawing:

FIG. 1 shows a diagram of a portion of a color television receiver, partly in block diagram form and partly in schematic circuit diagram form, incorporating an embodiment of the invention; and FIGS. 2 and 3 show circuit details of portions of the arrangement of FIG. 1.

In FIG. 1, chrominance signals supplied by a source 10 and luminance signals supplied by a source 15 are derived from a composite color television signal in a known manner by means of a suitable filter network which separates the chrominance and luminance components of the television signal. In particular, the filter network serves to attenuate the chrominance component, including a chrominance reference burst component which occurs during the so-called "back porch" interval of each horizontal image blanking interval, in the luminance signal as supplied by source 15.

Chrominance signals from source 10 are supplied to a chrominance signal processor 12 for developing R-Y, G-Y and B-Y color difference signals.

Luminance signals from source 15 are coupled via an emitter follower transistor 18, a resistor 20, and an AC signal coupling capacitor 22 to a luminance signal processing network 25, including video signal peaking circuits as will be discussed. Peaked luminance signals from network 25, appearing at a node A, are coupled via a gain controlled amplifier 30 and a signal coupling network 32 to a matrix amplifier 35. Matrix 35 combines the color difference signals with the peaked luminance signal (Y) to produce color image representative output signals R, G and B.

Amplifier 30 comprises a differential amplifier which is gain controlled in response to differential gain control voltages $V_1$ and $V_2$. These control voltages are derived from a gain control network 40 in accordance with the setting of a gain control potentiometer 42 operatively associated with network 40. A bias network 44 serves to establish the DC operating bias of gain control network 40. Network 40 additionally supplies a DC compensation voltage $V_3$ to amplifier 30, for maintaining the DC output level of amplifier 30 substantially constant as amplifier 30 is gain controlled in response to voltages $V_1$ and $V_2$. Gain control network 40 is described in greater detail in a copending U.S. patent application Ser. No. 296,865 of L. A. Harwood, et. al. titled "CIRCUIT FOR LINEARLY GAIN CONTROLLING A DIFFERENTIAL AMPLIFIER".

The luminance signal supplied by source 15, and as developed at node A, comprises periodic horizontal image intervals separated by image blanking intervals. Each horizontal blanking interval comprises a horizontal sync pulse interval, and a reference interval (i.e., the so-called "back porch" interval) during which a video signal black reference level occurs. The black reference level of the luminance signal processed by amplifier 30 is maintained at a desired value by means of a black level clamping network comprising a keyed comparator 50 including an associated output gating network 55, a resistor 58, and input AC coupling capacitor 22 which serves to store an output control voltage developed by comparator 50.

Comparator 50 is keyed to operate in response to timing signal $V_K$. When operating, comparator 50 compares the black reference level of the peaked luminance signal then appearing at node A with a reference voltage $V_R$ derived from bias source 44. An output control voltage from comparator 50 is representative of the difference between the black reference level of the luminance signal and reference voltage $V_R$. Gate 55 also conducts during the black level reference intervals of the luminance signal in response to keying signal $V_K$ for conducting the control voltage via resistor 58 and a delay line 60 to input AC coupling capacitor 22, which stores the control voltage. The control voltage exhibits a magnitude and sense for modifying the black reference level of the luminance signal so that the difference between the black reference level and reference voltage $V_R$, as sensed by comparator 50, is reduced. By this closed loop control action the black reference level of the luminance signal is maintained at a desired value. Additional information concerning the structure and operation of the described black reference level control network including comparator 50 is found in a copending U.S. patent application Ser. No. 296,864 of R. L. Shanley, II, et. al. titled "SIGNAL GAIN CONTROL WITH DC COMPENSATION", hereby incorporated by reference.

Delay line 60 serves to equalize the signal transit time of the luminance signal with respect to the chrominance signals so that the luminance and chrominance signals are applied to matrix 35 in proper time relationship. Delay line 60 is a wideband linear phase device throughout the luminance signal bandwidth of approximately 4.0 MHz, and also cooperates with circuits in a DC coupld differential input horizontal peaking network 65 for producing a horizontal peaking signal component, as will be discussed in greater detail with respect to the circuit of FIG. 2. Complementary phased wiseband luminance components from the output of an amplifier 68 DC coupled to an output terminal of delay line 60 are combined with complementary phased horizontal peaking components from network 65 in a signal combiner 70. The peaked output luminance signal from combiner 70, as indicated by the waveform at node A, includes a peaking preshoot component $V_{p1}$ and a peaking overshoot component $V_{p2}$ for accentuating amplitude transitions of the luminance signal.

The peaking signal output coupling path from peaking network 65 is inhibited by means of an attenuator 66, which responds to a PEAKING INHIBIT control signal $V_I$ which encompasses the luminance signal reference intervals when comparator 50 operates to generate the black level control voltage. Inhibiting the peaking path in this manner serves to stabilize the black level feedback control loop, and also prevents the comparator from responding to spurious signals including noise, which would otherwise be enhanced by the peaking network and adversely affect the control volage developed by the comparator. Peaking inhibit signal $V_I$ occurs over the horizontal blanking interval of the luminance signal and, together with timing signal $V_K$, is generated by means of a network including a timing signal generator 72 and a decoder 74. Signal generator 72 responds to horizontal synchronizing (sync) signals derived from the luminance signal, and to horizontal blanking and vertical blanking signals derived from the deflection circuits of the receiver in a known manner. A composite output timing signal from signal generator 72 is decoded by decoder 74 to provide output timing signals $V_I$ and $V_K$. As shown by the waveforms, timing signal $V_I$ occurs over horizontal blanking interval $T_H$, and timing signal $V_K$ occurs during an interval $T_K$ corresponding to the "back porch" portion of the horizontal blanking interval. The arrangement of timing signal generator 72 and decoder 74 can be of the type shown in U.S. Pat. No. 4,263,610 of R. L. Shanley, II, for example.

With respect to this feature of the disclosed control network it is noted that the control network comprises two feedback paths. The first feedback path includes comparator 50, gate 55, resistor 58, amplifier 68, and combiner 70. The second feedback path includes comparator 50, gate 55, resistor 58, delay line 60, peaking network 65, and combiner 70. In this example comparator 50 exhibits a signal gain of approximately ten and peaking network 65 exhibits a signal gain of approximately eight, whereby the second feedback loop exhibits a high gain of approximately 80. The inclusion of delay line 60, a reactive device, in the second control loop significantly increases the likelihood that the second control loop will become unstable and will oscillate at some frequency.

Specifically, delay line 60 is a linear phase device which exhibits a phase shift which increases linearly with increasing signal frequencies over the luminance signal bandwidth. The second control loop is susceptible of oscillation if the loop gain and loop phase shift are sufficient to sustain oscillation at some signal frequency (or frequencies) when comparator 50 and gate 55 are keyed to operate and the second control loop is closed. Illustratively, oscillation can occur at some signal frequency when the loop phase shift is on the order of zero degrees and the loop AC gain is equal to or greater than unity. A loop phase shift of other than zero degrees (e.g., 30° away from zero degrees phase shift) may lead to oscillation if the loop gain is large enough (i.e., significantly greater than unity).

The second control loop exhibits a phase shift of approximately 180° at low frequencies. However, the second control loop can be caused to oscillate at high video signal frequencies due to the high gain of the second control loop in combination with an additional phase shift on the order of 180° attributable to the phase shift associated with delay line 60 at one or more high video frequencies (e.g., between 2 MHz and 10 MHz). The effects of parasitic capacitances also contribute to the likelihood of oscillation at high signal frequencies. The oscillatory signal developed by an oscillating control loop will distort the control signal from comparator 50 (e.g., the oscillatory signal will be rectified in the control loop), contaminate other signals processed by the receiver, and impair the operation of any receiver circuits which rely on the video signal black reference level for proper operation.

The second control loop is prevented from oscillating by reducing the gain of the second control loop in response to the PEAKING INHIBIT signal, by an amount sufficient to preclude regenerative loop action. Specifically, in this case the peaking signal coupling path from the output of peaking network 65 is prevented from conducting peaking signals in response to the PEAKING INHIBIT signal. Inhibiting the peaking output signal from network 65 in this manner also advantageously prevents comparator 50 from responding to spurious signals which would otherwise be enhanced by the peaking network and distort the output control voltage from comparator 50. These enhanced spurious signals include high frequency noise, as well as residual chrominance burst components which may be present during the blanking "back porch" intervals when the comparator operates due to the fact that it is difficult to completely filter out the chrominance burst component. Additional information concerning this feature of the control arrangement is disclosed in connection with the circuit of FIG. 2 as will be discussed.

Delay line 60 exhibits a negligible impedance at DC, and serves to couple the DC black level control signal from comparator 50 and resistor 58 to charge storage capacitor 22. Thus the stored black level control voltage is applied via delay line 60 both to the luminance signal processed in the wideband luminance signal processing path of processor 25 via the input of amplifier 68, and to the peaking signal path via the differential inputs of horizontal peaking network 65.

As will be seen from the description of the circuit shown in FIG. 2, this arrangement advantageously assures that the DC level of the wideband luminance signal from amplifier 68 and the DC level of the peaking component from network 65 exhibit desired values when these signals are combined in combiner 70. Specifically, the DC determinative black level of the luminance signal is controlled, and the controlled luminance signal is combined with the peaking component, in a manner which significantly reduces the likelihood that an undesired DC offset will exist between the wideband luminance signal and the peaking component which are combined. Accordingly, the likelihood of a DC error in the peaked luminance signal and an associated error in the gray scale content of a reproduced image are significantly reduced. In addition, the desired peaking response (e.g., symmetrical peaking) of the peaked luminance signal is preserved by reducing the chance of a DC offset error which would otherwise distort the signal peaking response (e.g., by causing an asymmetrical peaking response to be developed when the wideband and peaking signals are combined wih a DC offset error).

The described luminance signal processing and control arrangement is DC coupled from the output of coupling capacitor 22 to the input of matrix 35. The system advantageously requires only one capacitor for input AC coupling and control voltage storage, namely capacitor 22, and requires a minimum number of external terminals when the arrangement is fabricated as an integrated circuit. In this regard it is noted that the arrangement of FIG. 1 can readily be constructed as an integrated circuit, with the exception of capacitor 22, delay line 60 and gain control potentiometer 42. In such case two external integrated circuit terminals would be required for coupling the input and output terminals of delay line 60 to amplifier 68 and peaking network 65. One of these terminals would be utilized for coupling capacitor 22 to the integrated circuit. Accordingly, the described arrangement makes economical use of the limited number of integrated circuit terminals available for external connections.

FIG. 2 shows details of luminance signal processor 25.

The wideband luminance as applied to the input of delay line 60 is coupled to one input of a differential amplifier comprising transistors 80 and 82 (comprising peaking network 65 of FIG. 1) via emitter follower transistors 75, 76 and a resistor 78. Delayed luminance signals from the output of delay line 60 are coupled to another input of differential amplifier 80, 82 via emitter follower transistors 85, 86 and a resistor 88. Thus delay line 60 is coupled between the base inputs of transistors 80 and 82. The delayed wideband luminance signal from the output of delay line 60 is also coupled via follower transistor 85 to a differential amplifier including transistors 90 and 92 (comprising amplifier 68 of FIG. 1). Differential amplifier 90,92 is included in a wideband luminance signal processing path of luminance processor 25, and differential amplifier 80,82 is included in a horizontal peaking path of processor 25.

Delay line 60 provides a signal delay on the order of 140 nanoseconds so that the amplitude-versus-frequency response of the horizontal peaking network has a peak amplitude response at approximately 1.8 MHz. Since the output of delay line 60 is terminated by the high output impedance of transistor 85, the delay line output is essentially unterminated relative to its characteristic impedance whereby the delay line operates in a voltage reflective mode with a reflective coefficient of approximately unity. The input of delay line 60 is terminated in its characteristic impedance by means of resistor 20 shown in FIG. 1.

A delayed luminance signal is developed at the base input of transistor 80. A luminance signal and a reflected and twice delayed luminance signal are developed as a sum at the base input of transistor 82. The signals developed at the base electrodes of transistors 80 and 82 cause differential amplifier 80,82 to develop preshoot and overshoot peaking signal components in the complementary phased collector circuits of transistors 80 and 82.

A circuit including transistors 94–97 comprises signal combiner 70. Emitter coupled transistors 94,95 receive the peaking component from transistor 80, and emitter coupled transistors 96,97 receive the complementary phased peaking component from transistor 82. The peaking component from transistor 82 is combined with the wideband luminance signal from transistor 92 at a node B, and the peaking component from transistor 80 is combined with the wideband luminance signal from transistor 90 at a node C. Accordingly, mutually complementary phased horizontally peaked luminance signals appear at nodes B and C. Additional information concerning the operation of a horizontal peaking component generator of the type described (i.e., including delay line 60 and differential amplifier 80,82) is found in the aforementioned copending U.S. patent application Ser. No. 255,982, of W. E. Harlan, now U.S. Pat. No. 4,350,995.

The magnitude of the peaking component can be controlled by controlling the conduction of transistors 94–97, such as by means of a peaking control voltage $V_p$. Control voltage $V_p$ can be derived from a manually adjustable, viewer controlled potentiometer. Alternatively, automatic peaking control can be accomplished in response to a control voltage derived as described in the aforementioned U.S. patent application of W. E. Harlan.

The peaking signal coupling path is inhibited, as discussed in connection with FIG. 1, in response to peaking inhibit control voltage $V_I$ which controls the conduction of a transistor 98. During the control intervals when comparator 50 operates, transistor 98 is non-conductive and a diode 99 conducts, whereby all of the peaking signal current is conducted by transistors 95 and 97 instead of by transistors 94 and 96. Accordingly, no peaking currents are summed with the video signal currents at nodes B and C. At other times transistor 98 conducts and diode 99 is non-conductive, whereby peaking signal currents are conducted to nodes B and C via transistors 94 and 96. Control signal $V_I$ can encompass the entire horizontal image blanking interval as discussed, or only that relatively smaller portion of the blanking interval during which comparator 50 operates. In the latter instance, however, care should be taken to ensure that the peaking signal coupling path is disabled for the entire duration of the comparator operating interval to ensure that loop oscillation will not occur. Thus in the latter instance, it may be necessary to time the occurrence of inhibit control signal $V_I$ so that it occurs over an interval which slightly overlaps the beginning and end of the comparator control interval during each horizontal blanking interval.

The black reference level of the wideband luminance signal as processed by amplifier 90,92 and as developed at signal combining nodes B and C is established in response to the output control voltage from comparator 50 as stored on capacitor 22. This black level control voltage is applied to the base input of transistor 90 via follower transistor 85.

The black level control voltage is also applied to the base inputs of peaking differential amplifier transistors 80 and 82 via first and second symmetrical coupling paths. The first coupling path comprises emitter follower transistors 85,86 and resistor 88, for coupling the control voltage to the base of transistor 80. The second coupling path comprises emitter follower transistors 75,76, resistor 78, and delay line 60 for coupling the control voltage to the base of transistor 82. In this regard, it is noted that delay line 60 exhibits a negligible impedance at DC. Accordingly, the DC base voltages of follower transistors 75 and 85, and thereby the differential base input DC voltages of peaking amplifier transistors 80 and 82, are substantially equal and track with changes in the level of the black reference control voltage from comparator 50.

The DC base voltages of transistors 80 and 82 are substantially equal. The common mode rejection characteristic of differential amplifier 80,82 advantageously prevents amplifier 80,82 from responding to common mode input signals, including the equal DC base voltage variations caused by variations of the black level control signal. Thus the varying black level control voltage does not upset the desired DC value of the peaking component generated by amplifier 80,82. As a result, the peaked luminance signal resulting from the summation of the peaking signal and the luminance signal has a proper DC level. In this regard it is noted that the peaking component preferably should have a DC value of zero. This is achieved in the described arrangement by means of the common mode input rejection of peaking amplifier 80,82, by means of input AC coupling via capacitor 22 (which also advantageously serves to store the black level control voltage), and by means of the symmetrical coupling paths between delay line 60 and the differential inputs of amplifier 80,82.

The described black level control arrangement provides an additional advantage when, as in this case, the input circuits of amplifier 68 and peaking signal generator 65 comprise differential input amplifiers, as discussed in greater detail in a copending U.S. patent application Ser. No. 304,346 of L. A. Harwood, et al. titled "CLAMPING ARRANGEMENT FOR A VIDEO SIGNAL PEAKING SYSTEM".

FIG. 3 shows additional details of amplifier 30 and gain control network 40 of FIG. 1.

In FIG. 3, the complementary phased peaked luminance signals from nodes B and C of FIG. 2 are applied to a network 110 including input common base transistors 100 and 102 which receive the luminance signals from nodes B and C and which apply these signals to differentially connected transistors 112 and 114, respectively. A single-phase peaked luminance signal is developed in the collector output circuit of transistor 112, and is coupled via transistor 118, resistor 121 and emitter follower transistor 123 to a transistor 130 included in amplifier 30.

Amplifier 30 comprises differentially connected transistors 132 and 134. Transistor 130 serves as a current source for transistors 132 and 134 together with an emitter resistor 138, and supplies the luminance signal to be amplified as well as operating bias current to amplifier transistors 132 and 134. Amplified peaked luminance signals are developed across a collector load resistor 139 and supplied to luminance signal coupling network 32 shown in FIG. 1. Amplifier transistors 132,134 are differentially gain controlled in response to differential gain control voltages $V_1$ and $V_2$ provided from gain control circuit 40 as will be described. A DC compensation voltage $V_3$ also provided from circuit 40 is applied to the collector output of transistor 134 for maintaining the quiescent DC collector voltage and current of transistor 134 substantially constant as amplifier transistors 132 and 134 are gain controlled.

Gain control circuit 40 comprises a differentially connected current splitter including a transistor 142 and a diode-connected transistor 144. Symmetrical bias networks comprising a resistor 145 and a current source 146, and a resistor 148 and a current source 149, are respectively associated with transistor 142 and diode-connected transistor 144. Differential gain control voltages $V_1$ and $V_2$ are varied by varying the conduction of current source 146 in response to the setting of gain control potentiometer 42. The bias of gain control circuit 40 is a function of DC operating supply current supplied to transistor 142 and diode 144 from a current source including a transistor 150 and an associated emitter resistor 152. Transistor 150 is biased by means of a stable DC reference voltage $V_R$ derived from bias source 44 shown in FIG. 1.

The described DC compensation of amplifier 30, whereby the DC output level of amplifier 30 remains substantially constant as amplifier 30 is gain controlled, is maintained as long as the bias currents provided by current source 130 of amplifier 30 and by current source 150 of gain control circuit 40 exhibit a predetermined relationship (in this case equality). This relationship is maintained by means of the control loop including comparator 50, which also serves to establish the black reference level of the video signal as noted previously.

Specifically, during each black reference interval comparator 50 senses and compares the DC voltages developed across respective emitter resistors 138 and 152 of current source transistors 130 and 150. As seen from the description of FIGS. 1 and 2, the output control voltage from comparator 50 is representative of the difference between these sensed voltages, and is used to modify the charge on storage capacitor 22 so as to reduce the difference between these voltages. Thus the control loop including comparator 50 also serves to substantially equalize the DC bias currents provided by current sorce transistors 130 and 150 so that the desired DC compensation of gain controlled amplifier 30 is preserved, as described in greater detail in the aforementioned copending U.S. patent application Ser. No. 296,864 of R. L. Shanley, II, et al.

What is claimed is:

1. A video signal processing system comprising:
    a source of video signals comprising image intervals and blanking intervals including a reference interval containing a reference level;
    a video signal processing path, including means responsive to said video signals for generating a peaking component at an output, and means for combining said peaking component with said video signal to produce a peaked video signal;
    a control network responsive to said peaked video signal during said reference intervals and coupled to said video signal path for automatically maintaining a desired condition of the reference level of video signals processed by said video path; and
    means for attenuating the signal output of said peaking component generating means during said reference intervals.

2. A video signal processing system comprising:
    a source of video signals comprising image intervals and blanking intervals including a reference interval containing a reference level;
    a video signal path having an input coupled to said source, and an output;
    a peaking network having an input coupled to said source, for generating a video signal peaking component at an output;
    a combining network for combining output signals from said video signal path and said peaking network to produce a peaked video signal;
    a control network responsive to said peaked video signal during said reference interval and arranged in a feedback control loop with said video signal path and said peaking network, for automatically maintaining a desired condition of the reference level of video signals in said video path; and
    means for attenuating said peaking component during said reference intervals.

3. A system according to claim 2, wherein
    said attenuating means inhibits said peaking component output of said peaking network during said blanking interval including said reference interval of said video signal.

4. A system according to claim 2, wherein said peaking network comprises a video signal delay line.

5. A system according to claim 4, wherein
    said delay line is coupled between said source of video signals and said inputs of said video path and said peaking network.

6. A system according to claim 2, wherein
    a capacitor AC couples video signals from said source to said inputs of said video path and said peaking network; and
    said peaking network comprises a video signal delay line coupled between the output of said coupling capacitor and said inputs of said video path and peaking network.

7. A system according to claim 6, and further comprising:
    means for storing an output control voltage developed by said control network for maintaining a desired condition of said video signal reference level.

8. A system according to claim 7, wherein
    said storing means consists of said AC coupling capacitor.

9. A system according to claim 7, wherein
    said attenuating means completely inhibits said peaking component output of said peaking network during said video signal reference intervals.

10. A system according to claims 7 or 8, wherein:
    said control network comprises a comparator operative during said reference intervals for comparing said reference level with a reference voltage to develop an output control voltage representative of the difference between said reference level and said reference voltage; and
    said control voltage is coupled to said storing means for modifying the charge stored thereby in a direction to reduce said difference.

11. A system according to claim 10 and further comprising
    an amplifier responsive to said peaked video signal and having associated bias means for establishing the DC bias of said amplifier means, said DC bias of said amplifier means being a function of said video signal reference level;
    a gain control circuit having associated bias means for establishing the DC bias of said gain control circuit, said gain control circuit providing a gain control signal for controlling the signal gain of said amplifier and also providing a DC compensation signal for said amplifier such that the DC output level of said amplifier is compensated to remain substantially constant as said amplifier is gain controlled in response to said gain control signal; and wherein
    said comparator compares a voltage representative of said DC bias of said amplifier during said video signal reference intervals wih a reference voltage representative of said DC bias of said gain control circuit.

* * * * *